United States Patent
Uji et al.

(10) Patent No.: US 7,677,715 B2
(45) Date of Patent: Mar. 16, 2010

(54) INK JET RECORDING APPARATUS

(75) Inventors: Ayako Uji, Tokyo (JP); Noribumi Koitabashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 11/340,465

(22) Filed: Jan. 27, 2006

(65) Prior Publication Data

US 2006/0170724 A1 Aug. 3, 2006

(30) Foreign Application Priority Data

Feb. 1, 2005 (JP) ............................. 2005-024919

(51) Int. Cl.
*B41J 29/38* (2006.01)

(52) U.S. Cl. ................. 347/102; 106/31.27; 106/31.36; 106/31.43; 106/31.58; 347/16; 347/96; 347/100; 347/101; 427/148; 427/500; 524/100

(58) Field of Classification Search ....................... None
See application file for complete search history.

(56) References Cited

U.S. PATENT DOCUMENTS

| | | | |
|---|---|---|---|
| 5,356,464 A * | 10/1994 | Hickman et al. | 106/31.36 |
| 5,580,373 A | 12/1996 | Lane et al. | 106/20 R |
| 5,668,584 A * | 9/1997 | Broder et al. | 347/102 |
| 5,997,623 A * | 12/1999 | Lin | 106/31.58 |
| 6,007,182 A | 12/1999 | Matsubara et al. | 347/43 |
| 6,164,772 A | 12/2000 | Koitabashi et al. | 347/100 |
| 6,180,691 B1 * | 1/2001 | Cheng et al. | 523/160 |
| 6,224,203 B1 * | 5/2001 | Wotton et al. | 347/101 |
| 6,244,700 B1 * | 6/2001 | Kimura et al. | 347/102 |
| 6,367,923 B1 | 4/2002 | Koitabashi | 347/101 |
| 6,379,000 B1 | 4/2002 | Koitabashi | 347/100 |
| 6,387,168 B1 | 5/2002 | Koitabashi et al. | 106/31.6 |
| 6,435,677 B1 | 8/2002 | Koitabashi et al. | 347/96 |
| 6,471,347 B1 | 10/2002 | Koitabashi et al. | 347/98 |
| 6,471,348 B1 | 10/2002 | Koitabashi | 347/100 |
| 6,471,757 B1 | 10/2002 | Koitabashi et al. | 106/31.28 |
| 6,494,569 B2 | 12/2002 | Koitabashi et al. | 347/98 |
| 6,527,385 B2 | 3/2003 | Koitabashi et al. | 347/101 |
| 6,533,409 B2 | 3/2003 | Koitabashi | 347/101 |
| 6,540,344 B2 | 4/2003 | Kashiwazaki et al. | 347/100 |
| 6,550,904 B2 | 4/2003 | Koitabashi et al. | 347/100 |
| 6,585,815 B2 | 7/2003 | Koitabashi et al. | 106/31.27 |
| 6,612,691 B1 | 9/2003 | Koitabashi et al. | 347/105 |

(Continued)

FOREIGN PATENT DOCUMENTS

EP 1 300 252 A2 4/2003

(Continued)

*Primary Examiner*—Matthew Luu
*Assistant Examiner*—John P Zimmermann
(74) *Attorney, Agent, or Firm*—Fitzpatrick, Cella, Harper & Scinto

(57) ABSTRACT

When an image is formed by imparting aqueous ink discharged from a recording head onto a recording medium P, water content contained in the aqueous ink is evaporated by a heater to suppress curl generated in the recording medium P after the image formation. The aqueous ink contains at least 15% by weight of curl control agent, and the viscosity of the aqueous ink is lower than 4 cp. The viscosity is increased to suppress the curl generation by evaporating the water content contained in the aqueous ink imparted on the recording medium P after the image formation.

7 Claims, 5 Drawing Sheets

U.S. PATENT DOCUMENTS

| | | | |
|---|---|---|---|
| 6,786,587 B2 | 9/2004 | Koitabashi | 347/96 |
| 6,860,593 B2 | 3/2005 | Kashiwazaki et al. | 347/100 |
| 6,964,700 B2 | 11/2005 | Uji et al. | 106/31.28 |
| 6,966,944 B2 | 11/2005 | Shimomura et al. | 106/31.43 |
| 7,419,255 B2 * | 9/2008 | Kawaguchi et al. | 347/102 |
| 2002/0130939 A1 * | 9/2002 | Jacob | 347/102 |
| 2003/0016269 A1 * | 1/2003 | Sekiya | 347/42 |
| 2003/0137572 A1 * | 7/2003 | Miyamoto et al. | 347/102 |
| 2004/0041893 A1 * | 3/2004 | Hoshino | 347/102 |
| 2004/0141041 A1 * | 7/2004 | Tsutsumi et al. | 347/102 |
| 2004/0231556 A1 | 11/2004 | Shimomura et al. | 106/31.43 |

FOREIGN PATENT DOCUMENTS

| | | |
|---|---|---|
| JP | 9-30710 A | 2/1997 |
| JP | H09-076538 | 7/1997 |
| JP | 2004-217930 | 8/2004 |

* cited by examiner

INK JET RECORDING APPARATUS

BACKGROUND OF THE INVENTION

1. Field of the Invention

The present invention relates to an ink jet recording apparatus, and particularly to an ink jet recording apparatus provided with a function of suppressing curl generated in a recording medium after image formation.

2. Related Background Art

Recently, the ink jet recording apparatus is rapidly becoming widespread because of merits such as high image quality and low running cost. In a sheet material that is of the recording medium, not only plain paper but also dedicated paper for obtaining a photograph or a print having the same image quality as a printing technology is generally used. However, when the high-quality image is obtained by the ink jet technology, since solid printing is performed on the substantially whole surface of the sheet material, the ink discharge amount is remarkably increased, which results in problems such as cockling and curl. The cockling is a phenomenon in which the print is undulated after the image formation, and the curl is a phenomenon in which the print curls up. Particularly, in the high-speed printing or both-side printing, the generation of the curl becomes remarkable. Conventionally there is a method of suppressing the generation of the curl by adding a curl inhibitor into the ink to increase a viscosity of ink (for example, see Japanese Patent Application Laid-Open Nos. 2004-217930 and H09-176538).

According to the study results of the present inventors, the increase in viscosity of the ink by the addition of the curl inhibitor causes ink clogging to be generated in a discharge nozzle. When the ink having the high viscosity is used, ink jet discharge performance is decreased to lower the image quality after the image formation, and it is confirmed that apparatus performance and reliability are lost.

SUMMARY OF THE INVENTION

In view of the foregoing, an object of the invention is to provide an ink jet recording apparatus that can eliminate the problem that the recording medium curls.

In order to achieve the above object, there is provided an ink jet recording apparatus according to the invention in which an image is formed by imparting aqueous ink discharged from a recording head onto a recording medium, wherein the aqueous ink contains at least a predetermined amount of curl control agent, the aqueous ink has viscosity not more than a predetermined amount, and the ink jet recording apparatus includes curl control means for increasing the viscosity of the aqueous ink, the curl control means evaporating water content included in the aqueous ink, the curl control means suppressing curl generation in the recording medium after the image formation.

Accordingly, in the ink jet recording apparatus having the above configuration, when the aqueous ink is discharged from the recording head to form the image on the recording medium, the water content in the ink is rapidly evaporated to increase the viscosity of the ink by the curl control means immediately after the ink is imparted on the recording medium. Therefore, the generation of the short-term curl, which is generated, particularly immediately after the image information, is suppressed. In this case, the aqueous ink contains at least 15% weight of solvent having the curl decreasing effect, and the viscosity of the aqueous ink is lower than 4 cp. The means for heating the surface temperature of the recording medium immediately after the image formation is preferable as the curl control means for evaporating the water content in the aqueous ink, and means for blowing warm air on the formed image is also preferable from the viewpoint of evaporation promotion. For the condition in which the evaporation means such as the heating is performed, assuming that an aqueous ink discharge amount per unit area is set at 100% when the 4-pl ink is discharged in resolution of 1200 dpi by 1200 dpi, the aqueous ink discharge amount is preferably at least 25%. Since the means for evaporating the water content in the aqueous ink is adopted for the curl control, unlike the conventional case where the curl is suppressed by adding the large amount of curl inhibitor, the viscosity of the ink is not increased and the clogging is not generated in the discharge nozzle.

According to the ink jet recording apparatus of the invention, in the recording medium after the image formation, the water content in the imparted aqueous ink is evaporated to increase the viscosity of the ink by the curl control means, which effectively suppresses the curl of recording medium, particularly the generation of the short-term curl.

DETAILED DESCRIPTION OF THE PREFERRED EMBODIMENTS

An ink jet recording apparatus according to a preferred embodiment of the invention will be described in detail with reference to the accompanying drawings.

First Embodiment

Figure 1:
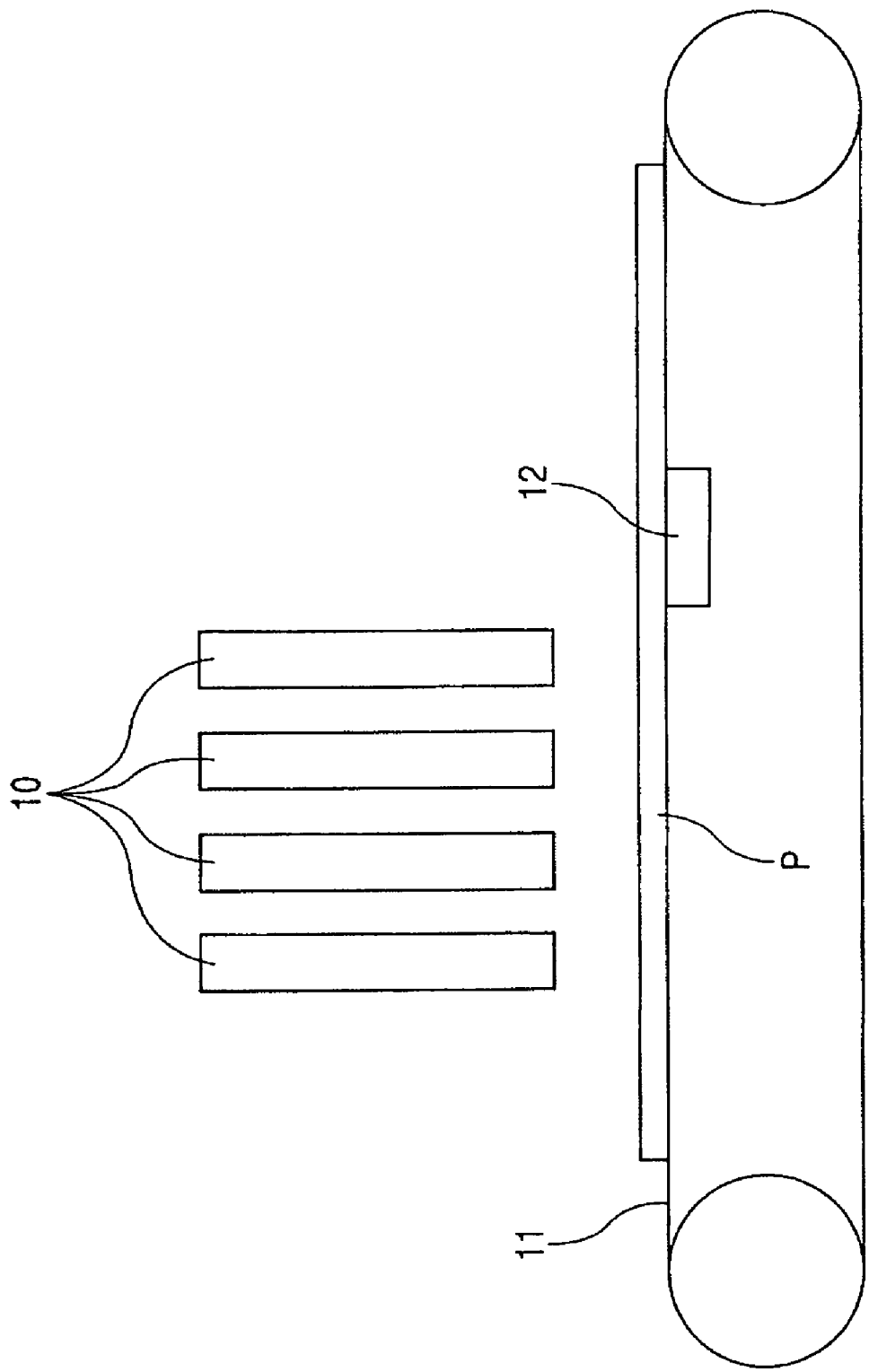
FIG. 1 is a view showing a fully multi type ink jet recording apparatus according to a first embodiment of the invention.

FIG. 1 shows an ink jet recording apparatus according to a first embodiment of the invention. The ink jet recording apparatus of the first embodiment performs fully multi recording. In the fully multi recording, plural recording heads 10 including discharge nozzles whose width is substantially similar to a total width of a recording medium P are fixed, and the image is formed on the recording medium P by the recording heads 10 while the recording medium P is conveyed. That is, the plural discharge nozzles aligned in a head width direction are arranged on one side of the recording head 10, a conveyance belt 11 which conveys the recording medium P is also provided, and the recording medium P is conveyed while the whole surface of the recording medium P is brought into contact with the conveyance belt 11 by electrostatic adsorption. A heater (heating means) 12 is arranged which performs heating on a downstream side of a region where the recording heads 10 form the image. The heater 12 is of curl control means of the invention, and the heater 12 is operated when an ink discharge amount exceeds a predetermined criterion.

The curl control means used in the apparatus is based on the following concept of a curl generation mechanism confirmed by the present inventors.

If the recording medium P is such as the paper sheet material, ink droplets are applied onto the recording medium by image forming and fiber in the paper surface absorbs ink droplets so that bonding between pieces of paper fiber is released, and the paper is increased in length. The water content evaporation is started in the paper surface immediately after the printing, the pieces of fibers in the paper surface is compressed by re-crystallization. At this point, because the bonding state between the pieces of paper fiber is different from the bonding state previous to the printing, it is thought that the curl is created by generating internal stress to compress the paper in an anisotropic manner.

Such curl generation phenomenon is easy to occur in relatively slow air drying, and water content in the ink imparted in the paper surface is substantially evaporated in about ten minutes in the normal environment. In this case, when the water content included in the ink imparted to the paper is low particularly while the ink has the high viscosity, the paper compression is suppressed, and particularly the short-term curl is effectively suppressed.

Further, according to the experiment result of the present inventors, when the relatively large amount of water content is included in the ink while the ink has the low viscosity, the long-term curl is relatively effectively suppressed as long as a curl control agent not lower than a predetermined amount is included in the ink.

When the ink having the low water content and high viscosity is used, the short-term curl can also be suppressed. However, in the apparatus, because the ink is discharged from the nozzle at a high frequency in the high-speed recording, it is advantageous that the ink possibly has the low viscosity in consideration of ink refill and the like. Accordingly, both the short-term curl control and the long-term curl control, and ink discharging properties, are considered for ink composition. The short-term curl and the long-term curl are effectively suppressed by blowing warm air to evaporate the water content at the time when the curl is not substantially generated immediately after the ink is imparted. The water content in the ink at the time of imparting is decreased at once immediately after imparting the ink and the substantial viscosity of the ink is increased. Therefore, it is thought that the ink is changed such that the short-term curl can also be suppressed.

As described above, in order to suppress the short-term curl, it is necessary to control the water content imparted on the recording medium P and the viscosity. Even if the ink imparted onto the recording medium P includes the large amount of water content and has low viscosity, the water content is decreased to increase the viscosity by evaporating the water content in a short time by some means, which obtains the same effect. Therefore, a relationship between the water content in the ink and the viscosity will be studied below.

Figure 2:
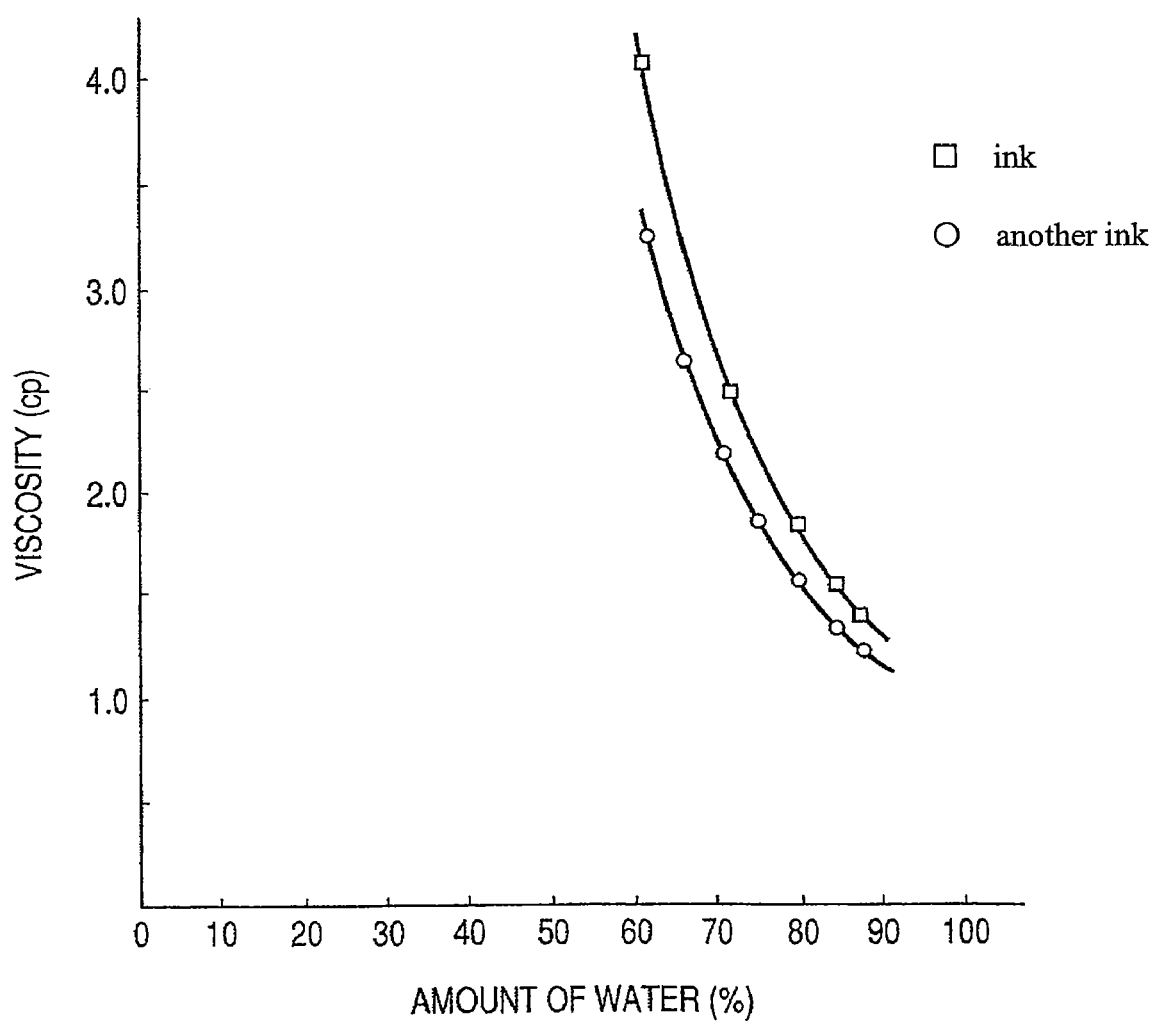
FIG. 2 is a graph showing a correlation between a water amount of ink and a viscosity of ink which are obtained by the ink jet recording apparatus of the first embodiment and a curl control method.

With reference to the relationship between the water content in the ink and the viscosity, the ink contains water, a color material such as dye and pigment, and an aqueous solvent such as a non-volatile solvent. FIG. 2 shows a correlation diagram between the water content (%) and the viscosity (CP). As shown in FIG. 2, as the water content in the ink is decreased, the viscosity is increased. When 1,2,6-hexanetriol and trimethylolpropane are used as the curl control agent, the viscosity can further be increased.

Figure 3:
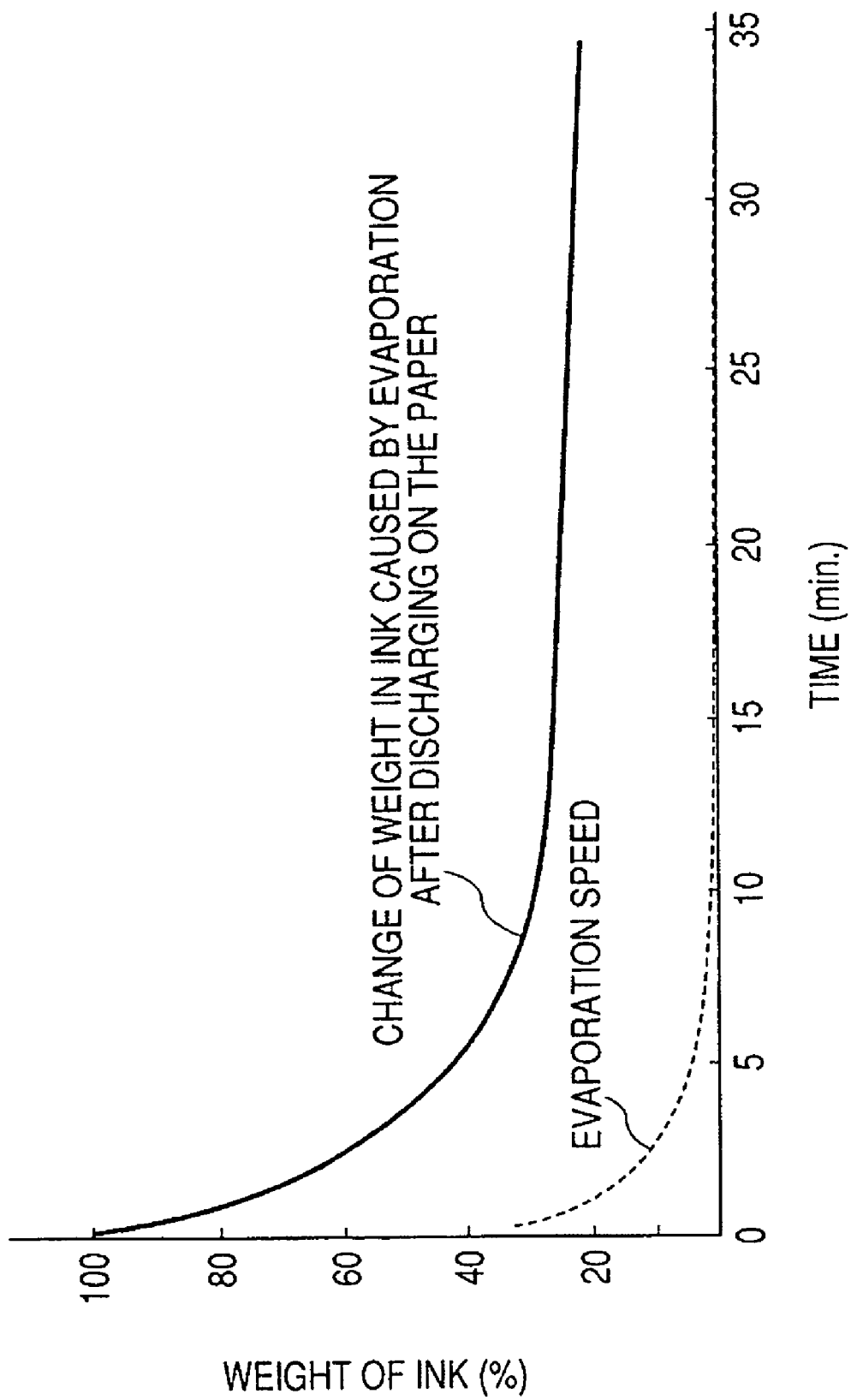
FIG. 3 is a graph showing transition of an ink weight after ink is imparted under environments of room temperature of 25° C. and humidity of 50% RH in a correlation between an ink weight and a time.
Figure 4:
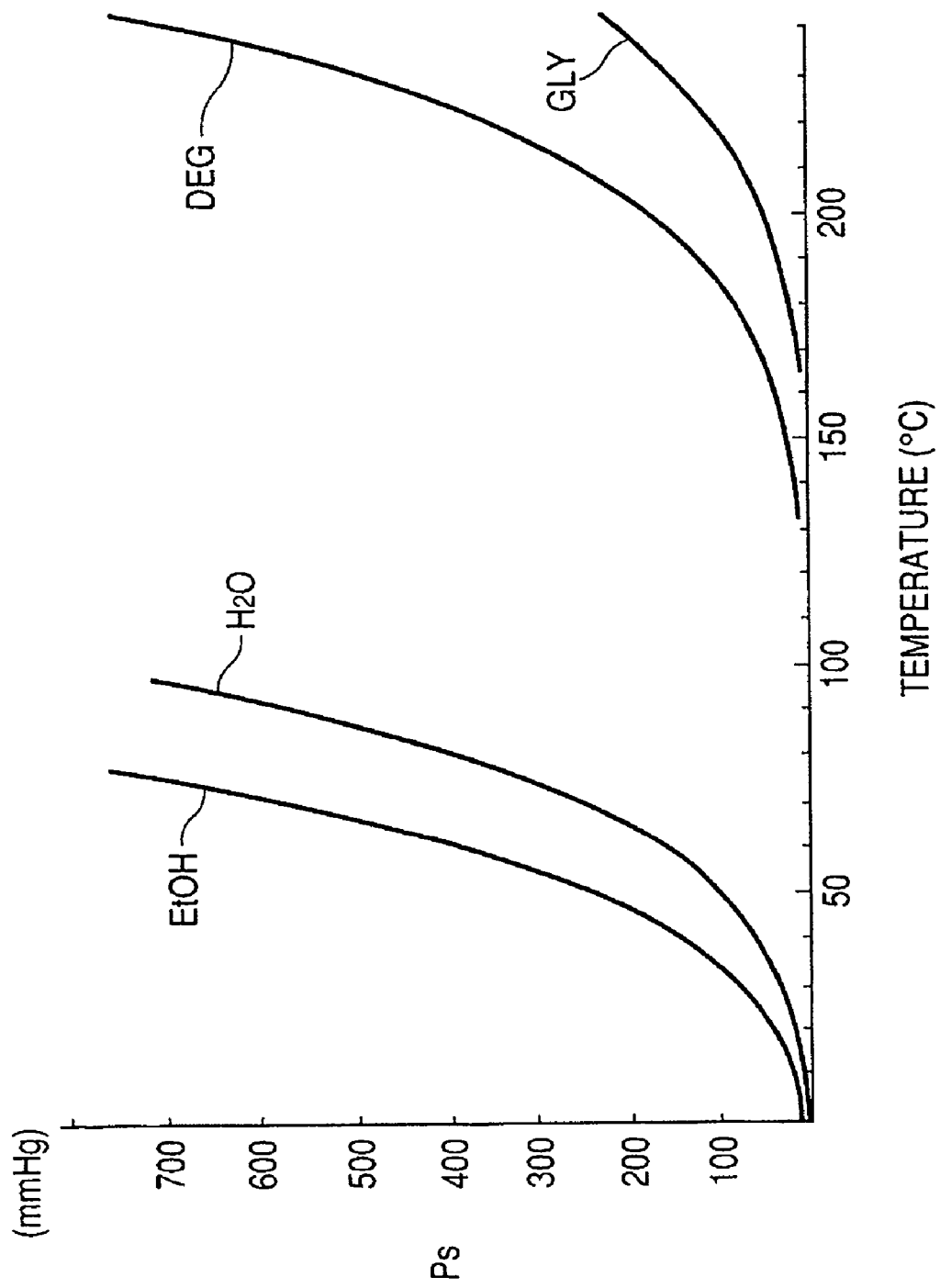
FIG. 4 is a graph showing saturated vapor pressures of water and the like to temperature.

The evaporation speed of the water content in the ink largely depends on water vapor pressure at the environmental temperature. The water content in the ink is rapidly evaporated immediately after the ink is imparted onto the paper, and then the water content in the ink is gradually evaporated. FIG. 3 shows transition of an ink weight after the ink is imparted under environments of room temperature of 25° C. and humidity of 50% RH. As can be seen from FIG. 3, 50% water content in the ink is evaporated in about five minutes, and all the water content in the ink is substantially evaporated in about ten minutes. The measurement of water evaporation speed shows that the environment at 60° C. is ten times faster than the environment 25° C. in the water evaporation. As shown in FIG. 4, the result of the water evaporation speed can also be estimated from saturated vapor pressure curves of the water and the like to the temperature. It is estimated that the environment at 100° C. is at least 30 times faster than the environment 25° C. in the water evaporation.

Accordingly, when the liquid droplet is imparted to the recording medium P such as plain paper and coated paper to form the image, it is preferable that the ink contain at least 15% by weight of solvent having the effect of decreasing the long-term curl of the print and that the ink have the viscosity lower than 4 cp. The heater 12 which heats the print immediately after the image formation is used as the means for evaporating the water content in the ink imparted onto the recording medium P, and the heater 12 is preferably operated when the discharge ink amount per unit area exceeds the predetermined criterion. With reference to the heating condition, assuming that the ink discharge amount per unit area is set at 100% when the 4-pl ink is discharged in resolution of 1200 dpi by 1200 dpi, the ink discharge amount is preferably at least 25%.

That is, it is assumed that an ink deposit amount per unit area is set at 100% when the ink deposit amount is 8.93 ml/m$^2$, and the heater 12 is operated when the ink deposit amount is at least 2.23 ml/m$^2$ which are of at least 25%.

Specifically a ceramic heater, a heat source lamp, a dryer, and the like are used as the heater 12. The water content in the ink imparted onto the recording medium P is rapidly evaporated to suppress the generation of the short-term curl by the heater 12. For the amount of water content evaporated in a short time after imparting the ink, the water content in the ink is set not more than 60%, and paper surface temperature is adjusted in a temperature range of 60° C. to 140° C.

It is more preferable that at least 90% water content in the ink imparted is evaporated in one minute after the printing. Referring to FIG. 3, it takes about ten minutes to evaporate at least 90% water content at 25° C. In order to evaporate at least 90% water content in one minute, it is necessary that the paper surface temperature is set at 60° C. However, it is not preferable that the water content be excessively evaporated, because the paper is shortened in itself. Therefore, it is preferable that the evaporation be controlled according to the ink discharge amount.

In order to set the water content in the ink at 70%, and in order to decrease the 70% water content to 60% after five seconds elapses since the ink containing the 70% water content is imparted onto the recording medium, it is necessary that the paper surface temperature be set at about 60° C. When the paper surface temperature is set at 100° C., the water content in the ink can be evaporated in about one minute.

EXAMPLE 1

In the apparatus of the first embodiment shown in FIG. 1, the plain paper is used as the specific example of the recording medium P, and the curl is measured when the ink discharge amount per unit area is 100%. Example of the ink used is shown below:

Ink 1C.1

| Direct Blue 199 | 3.5% by weight |
|---|---|
| isopropyl alcohol | 2.5% by weight |
| 1,2,6-hexanetriol | 27% by weight |
| urea | 2% by weight |
| Acetylenol EH | 1% by weight |
| water | 64% by weight |

Ink 2C.1

| Direct Blue 199 | 3.5% by weight |
|---|---|
| isopropyl alcohol | 2.5% by weight |
| 1,2,6-hexanetriol | 17% by weight |
| urea | 10% by weight |
| Acetylenol EH | 1% by weight |
| water | 64% by weight |

Ink 3C.1

| Direct Blue 199 | 3.5% by weight |
|---|---|
| isopropyl alcohol | 2.5% by weight |
| trimethylolpropane | 17% by weight |
| urea | 10% by weight |
| Acetylenol EH | 1% by weight |
| water | 64% by weight |

Here, Ink 1 has the viscosity of 3.9 cp, Ink 2 has the viscosity of 2.9 cp, and Ink 3 has the viscosity of 2.8 cp.

1,2,6-hexanetriol and trimethylolpropane contained in the above ink composition are the solvent having the effect to the long-term curl of the print. As described above, the water content in the ink is adjusted not more than the predetermined value, and the viscosity of the ink is adjusted at least the predetermined value, which allows the short-term curl generated immediately after the printing to be decreased. In the high-speed recording, since the ink is discharged from the nozzle at a high frequency, it is advantageous that the ink has the low viscosity in consideration of the ink surroundings. The viscosity of the ink can be decreased, when the water content in the ink is increased, by suppressing the solvent amount of curl depressor to the minimum amount in which the effect of the curl depressor is exerted or by adding another solvent. On the contrary, the short-term curl is easy to generate because the viscosity of the ink is decreased. However, in the first embodiment, the water content in the ink is rapidly evaporated immediately after the printing by performing the heating with the heater 12. As a result, the short-term curl control effect can be obtained on the equality with the case where the ink in which the water content and the viscosity are adjusted is imparted to the recording medium. Accordingly, the long-term curl is also effectively suppressed by decreasing the short-term distortion.

Second Embodiment

Figure 5:
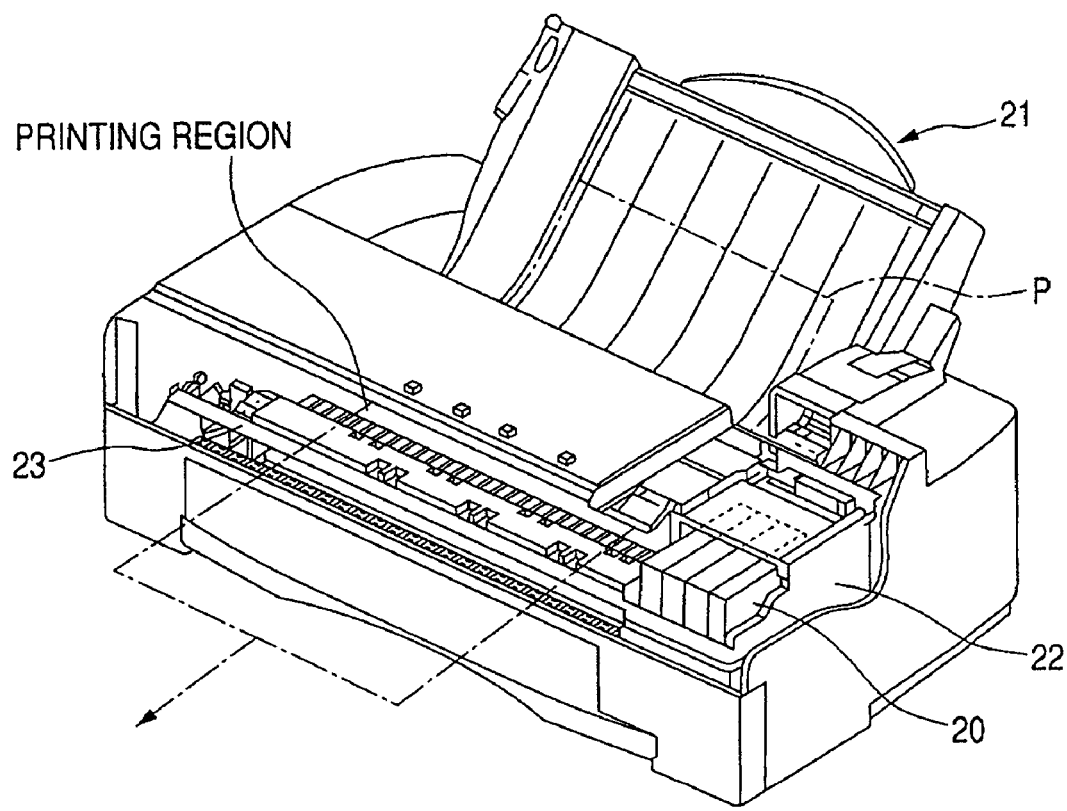
FIG. 5 is a perspective view showing a serial type ink jet recording apparatus according to a second embodiment of the invention.

FIG. 5 shows an ink jet recording apparatus according to a second embodiment. The ink jet recording apparatus of the second embodiment is a serial recording ink jet recording apparatus in which the image is formed in the recording medium P while scan is performed by a recording head 20 having a narrow width. The ink jet recording apparatus includes a paper feeding portion 21 and a carriage 22. The recording medium P is loaded on the paper feeding portion 21, and the carriage 22 is moved in the direction perpendicular to the direction in which the recording medium P is conveyed. The recording head 20 is mounted on the carriage 22, and a plate heater (not shown) is buried immediately behind the area where the image is formed by the recording head 20 (paper discharge side). The plate heater is of the heating means extending in the direction parallel to the moving direction of the carriage 22. A guide rail 23 which guides the running is provided in the proceeding direction of the recording medium P.

EXAMPLE 2

The curl is measured with the ink jet recording apparatus shown in FIG. 5, when the ink discharge amount per unit area is 100% for the plain paper which is of the recording medium P. In Example 2, the ink similar to the ink of Example 1 is used, and the heater is operated when the ink discharge amount exceeds the predetermined criterion.

As described in Example 1, the short-term curl is easily generated by decreasing the viscosity of the ink. However, in Example 2, the water content is rapidly evaporated immediately after the printing by performing the heating with the heater, and thereby the short-term curl control effect can be obtained on the equality with the case where the ink in which the water content and the viscosity are adjusted is imparted to the recording medium. Accordingly, the long-term curl is also effectively suppressed by decreasing the short-term distortion.

COMPARATIVE EXAMPLE

Figure 6:
FIG. 6 shows a curl measurement method in the second embodiment.

In Comparative Example, the curl is measured using the same ink as Examples 1 and 2 when the short-term suppression process is not performed. In the curl measurement method shown in FIG. 6, amounts of curl from a horizontal plane are measured in four corners of the recording medium P to compute an average value. Table 1 shows the curl measurement result of Comparative Example for Examples 1 and 2. From the result shown in Table 1, for Ink 1, Ink 2, and Ink 3, it is confirmed that the short-term curl is largely generated while the curl is decreased after one week by a solvent having the long-term curl control effect.

TABLE 1

| | AFTER ONE MINUTE FROM PRINTING | AFTER ONE WEEK |
|---|---|---|
| INK1 | 17 mm | 10 mm |
| INK2 | 20 mm | 15 mm |
| INK3 | 30 mm | 25 mm |

Thus, the first and second embodiments are described for the ink jet recording apparatus of the invention. However, the invention is not limited to the above embodiments, but other embodiments, combinations thereof, and various modifications could be made without departing from the scope of the invention.

This application claims priority from Japanese Patent Application No. 2005-024919 filed on Feb. 1, 2005, which is hereby incorporated by reference herein.

What is claimed is:

1. An ink jet recording apparatus in which an image is formed by imparting aqueous ink discharged from a recording head onto a recording medium,
   wherein the aqueous ink contains at least a predetermined amount of curl control agent,
   the aqueous ink has viscosity lower than 4 cp, and
   the ink jet recording apparatus includes heating means for heating the recording medium to evaporate water content included in the aqueous ink so that the viscosity of the aqueous ink increases, whereby curl generation in the recording medium after the image formation is suppressed,
   wherein the heating means heats the recording medium at the time when the curl is not generated to evaporate water content included in the aqueous ink, and
   wherein the heating means is activated when an ink discharge amount per area is not less than 2.23 ml/mm$^2$ and not activated when the ink discharge amount per area is less than 2.23 ml/mm$^2$.

2. An ink jet recording apparatus according to claim 1, wherein the aqueous ink contains at least 15% by weight of curl control agent.

3. An image forming apparatus for forming an image by using a recording head for discharging ink, the apparatus comprising:
   conveyance means for conveying a recording medium at a position where the conveyance means faces the recording head; and
   heating means for heating the recording medium such that a surface temperature ranges from 60 degrees Celsius to 140 degrees Celsius at a portion where recording is completed in the recording medium,
   wherein the ink contains at least 16% by weight of curl control agent, and the ink contains at least 60% by weight of water,
   wherein the heating means evaporates moisture in ink deposited on the recording medium to increase the viscosity of the ink,
   wherein the heating means heats the recording medium at the time when the curl is not generated to evaporate water content included in the aqueous ink, and
   wherein the heating means is activated when an ink discharge amount per area is not less than 2.23 ml/mm$^2$ and not activated when the ink discharge amount per area is less than 2.23 ml/mm$^2$.

4. An ink jet recording apparatus according to claim 1, wherein the heating means heats the recording medium so that the water content of the ink is no more than 60% within ten seconds after recording is completed.

5. An ink jet recording apparatus according to claim 1, wherein the heating means heats the recording medium so that no less than 90% of the water content of the ink is evaporated within one minute after recording is completed.

6. An ink jet recording apparatus in which an image is formed by imparting aqueous ink discharged from a recording head onto a recording medium,
   wherein the aqueous ink contains at least a predetermined amount of curl control agent,
   wherein the aqueous ink has viscosity lower than 4 cp,
   wherein the ink jet recording apparatus includes heating means for heating the recording medium to evaporate water content included in the aqueous ink so that the viscosity of the aqueous ink increases, whereby curl generation in the recording medium after the image formation is suppressed,
   wherein the heating means heats the recording medium at the time when the curl is not generated to evaporate water content included in the aqueous ink,
   wherein the curl control agent includes 1,2,6-hexanetriol or trimethylolpropane, and
   wherein the heating means is activated when an ink discharge amount per area is not less than 2.23 ml/mm$^2$ and not activated when the ink discharge amount per area is less than 2.23 ml/mm$^2$.

7. An image forming apparatus for forming an image by using a recording head for discharging aqueous ink, the apparatus comprising:
   a conveyance belt for attracting a recording medium by an electrostatic force so that the whole surface of the recording medium P is brought into contact with the conveyance belt, and for conveying a recording medium at a position where the conveyance belt faces the recording head; and
   heating means for heating the recording medium to evaporate water content included in the aqueous ink so that the viscosity of the aqueous ink increases, whereby curl generation in the recording medium after the image formation is suppressed,
   wherein the heating means is arranged at a position where the heating means performs heating on a downstream side of a region where the recording head forms the image,
   wherein the heating means heats the recording medium at the time when the curl is not generated to evaporate water content included in the aqueous ink,
   wherein the heating means is activated when an ink discharge amount per area is not less than 2.23 ml/mm$^2$ and not activated when the ink discharge amount per area is less than 2.23 ml/mm$^2$, and
   wherein the heating means is disposed on the opposite side of the conveyance belt to the recording head.

\* \* \* \* \*